US012577069B2

(12) United States Patent
Tsubaki

(10) Patent No.: US 12,577,069 B2
(45) Date of Patent: Mar. 17, 2026

(54) PRINTING APPARATUS COMPRISING NIP SWITCHING UNIT AND OPENING/CLOSING HOUSING PORTION

(71) Applicant: SEIKO EPSON CORPORATION, Tokyo (JP)

(72) Inventor: Kenichi Tsubaki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 18/616,462

(22) Filed: Mar. 26, 2024

(65) Prior Publication Data

US 2024/0327153 A1 Oct. 3, 2024

(30) Foreign Application Priority Data

Mar. 29, 2023 (JP) ................................ 2023-052910

(51) Int. Cl.

| | |
|---|---|
| ***B41J 13/02*** | (2006.01) |
| ***B41J 11/00*** | (2006.01) |
| ***B41J 15/04*** | (2006.01) |
| ***B41J 29/13*** | (2006.01) |
| ***B65H 5/06*** | (2006.01) |

(52) U.S. Cl.

CPC ............ *B65H 5/062* (2013.01); *B41J 11/006* (2013.01); *B41J 15/04* (2013.01); *B41J 29/13* (2013.01); *B65H 2402/441* (2013.01); *B65H 2403/514* (2013.01); *B65H 2404/1421* (2013.01); *B65H 2511/528* (2013.01); *B65H 2601/11* (2013.01)

(58) Field of Classification Search

None

See application file for complete search history.

(56) References Cited

U.S. PATENT DOCUMENTS

2016/0289023 A1* 10/2016 Uchino .................. B65H 1/266

FOREIGN PATENT DOCUMENTS

JP H11314793 A * 11/1999
JP 2006-039336 A 2/2006

OTHER PUBLICATIONS

English translation of JP 11-314793 A from Google Patents, publication date Nov. 16, 1999. (Year: 1999).*

* cited by examiner

*Primary Examiner* — Leslie J Evanisko
*Assistant Examiner* — Shlomit Chelst
(74) *Attorney, Agent, or Firm* — WORKMAN NYDEGGER

(57) ABSTRACT

When a user opens an opening/closing portion for accessing an inside of a housing, a shaft member is displaced in a +Z direction by a biasing force of a spring, and moves a lever member in the +Z direction. A rotation shaft rotates in a +θ direction along with displacement of the shaft member in the +Z direction. As a result, a cam rotates in the +θ direction together with the rotation shaft, and presses, by a projection portion, a cam reception portion of an arm unit main body in a −X direction against the biasing force of the spring. Due to this, the cam rotates the arm unit main body in a −θ direction. Then, a driven roller moves the +Z direction along with rotation of the arm unit main body in the −θ direction, and is switched from a nip state to a non-nip state.

4 Claims, 9 Drawing Sheets

PRINTING APPARATUS COMPRISING NIP SWITCHING UNIT AND OPENING/CLOSING HOUSING PORTION

The present application is based on, and claims priority from JP Application Serial Number 2023-052910, filed Mar. 29, 2023, the disclosure of which is hereby incorporated by reference herein in its entirety.

BACKGROUND

1. Technical Field

The present disclosure relates to a printing apparatus configured to form an image on a medium.

2. Related Art

In a printing apparatus or the like configured to convey a medium and perform printing, the medium is conveyed in a state of being nipped by a conveyance roller pair, that is, in a state of being sandwiched at a predetermined pressure. In such a printing apparatus, when a jam of the medium, that is, a trouble in which the medium is clogged without being correctly conveyed occurs, it is necessary to release the nip of the medium by the conveyance roller pair in order to perform jam processing of removing the jammed medium.

JP-A-2006-39336 discloses a configuration configured to switch, in conjunction with opening/closing of a cover closing an opening portion for jam processing, between a state in which a conveyance roller pair nips a medium and a state in which the nip is released. According to this configuration, when performing jam processing, the user no longer needs to perform an operation of releasing the nip separately from the operation of opening the cover. After the end of the jam processing, it is no longer necessary to perform an operation for restarting the nip of the medium separately from the operation of closing the cover.

However, in the configuration described in JP-A-2006-39336, opening/closing of the cover is detected by an opening/closing sensor, and switching of the nip state is executed using the power of a solenoid. For this reason, in a state where the power supply of the apparatus is off, the nip state cannot be switched in conjunction with opening/closing of the cover. Since the solenoid, the opening/closing sensor, and a circuit and wiring lines for electrically coupling them, and the like are required, there is a problem of an increase in the cost of the apparatus.

SUMMARY

A printing apparatus includes a conveyance roller pair including a driving roller and a driven roller and configured to sandwich and convey a print medium, an arm unit supporting the driven roller, a nip switching unit configured to switch between a nip state in which the driven roller is pressed against the driving roller and a non-nip state in which pressing of the driven roller against the driving roller is released, a printing unit configured to form an image on the print medium, and a housing internally accommodating the conveyance roller pair, the arm unit, the nip switching unit, and the printing unit, in which the nip switching unit includes a first rotation shaft, a lever member configured to move in a first direction and a second direction opposite to the first direction, a coupling member that includes a lever support portion supporting the lever member at one end and to which the first rotation shaft is non-rotatably coupled at another end, the coupling member being configured to rotate the first rotation shaft in a third direction along with displacement of the lever support portion in the first direction and rotate the first rotation shaft in a fourth direction opposite to the third direction along with displacement of the lever support portion in the second direction, a cam non-rotatably fixed to the first rotation shaft and configured to rotate in the third direction along with rotation of the first rotation shaft in the third direction and rotate in the fourth direction along with rotation of the first rotation shaft in the fourth direction, and a first biasing member configured to bias the lever support portion in the first direction, the arm unit includes a support shaft rotatably supporting the driven roller, a main body portion supporting the support shaft and including a cam reception portion with which the cam is configured to come into contact, a second rotation shaft supporting the main body portion rotatably in the third direction and the fourth direction, and a second biasing member configured to bias the main body portion to rotate the main body portion in the third direction, the housing includes an opening/closing portion configured to enable access to an inside of the housing, the opening/closing portion includes a lever pressing portion configured to press the lever member in the second direction, the lever pressing portion presses the lever member in the second direction and displaces the lever support portion in the second direction against a biasing force of the first biasing member when the opening/closing portion transitions from an open state to a closed state, and holds the lever member in a state of being pressed in the second direction in the closed state, the driven roller is maintained in the nip state by a biasing force of the second biasing member in the closed state, in a process in which the opening/closing portion transitions from the closed state to the open state, the lever support portion is released from pressing in the second direction by the lever pressing portion and is displaced in the first direction by the biasing force of the first biasing member to move the lever member in the first direction, the first rotation shaft rotates in the third direction along with displacement of the lever support portion in the first direction, the cam rotates in the third direction together with the first rotation shaft, and rotates the main body portion in the fourth direction by pressing the cam reception portion of the main body portion against the biasing force of the second biasing member, and the driven roller is switched from the nip state to the non-nip state along with rotation of the main body portion in the fourth direction.

DESCRIPTION OF EMBODIMENTS

Hereinafter, a printing apparatus 1 of the present embodiment will be described with reference to the drawings. The printing apparatus 1 of the present embodiment is, for example, an inkjet type printer configured to form a character or an image such as a photograph on a medium M by ejecting ink, which is an example of liquid, onto the medium M that is a print target. The type of the medium M is not particularly limited, but in the present embodiment, the medium M wound in a roll shape is used. The medium M corresponds to the print medium.

Each figure illustrates X-, Y-, and Z-axes that intersect with one another. Typically, the X-, Y-, and Z-axes are orthogonal to one another. The X-axis is parallel to the installation surface of the printing apparatus 1, and corresponds to the width direction of the printing apparatus 1. The Y-axis is parallel to the installation surface of the printing apparatus 1, and corresponds to the depth direction of the printing apparatus 1. The Z-axis is perpendicular to the installation surface of the printing apparatus 1, and corresponds to the height direction of the printing apparatus 1.

Hereinafter, a +X direction parallel to the X-axis is a leftward direction toward the front of the printing apparatus 1, and a −X direction parallel to the X-axis is a direction opposite to the +X direction. The +Y direction parallel to the Y-axis is a direction from the back toward the front of the printing apparatus 1, and a −Y direction parallel to the Y-axis is a direction opposite to the +Y direction. A +Z direction parallel to the Z-axis is an upward direction, and a −Z direction parallel to the Z-axis is a direction opposite to the +Z direction. Note that the +Z direction corresponds to the first direction and the sixth direction, and the −Z direction, which is the direction opposite thereto, corresponds to the second direction. The +X direction corresponds to the fifth direction.

Figure 1:
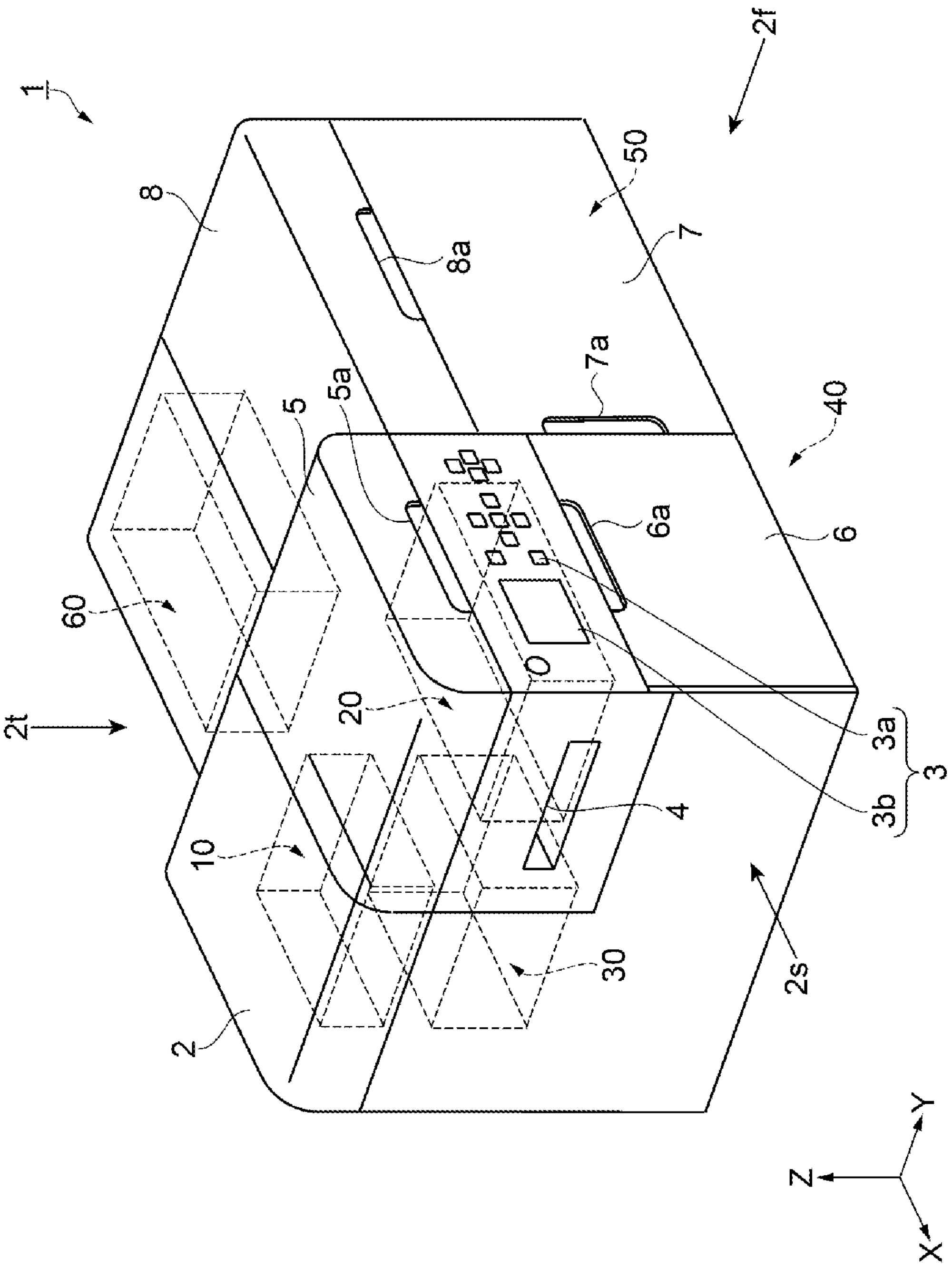
FIG. 1 is a perspective view illustrating a printing apparatus.

FIG. 1 is a perspective view illustrating the printing apparatus 1 of the present embodiment.

As illustrated in FIG. 1, the printing apparatus 1 includes a housing 2 having a substantially cuboid shape and accommodating an apparatus main body. The printing apparatus 1 further includes a printing unit 10, a medium conveyance unit 20, a maintenance unit 30, an ink storage unit 40, a medium storage unit 50, and a control unit 60 inside the housing 2. That is, the housing 2 constitutes an exterior of the printing apparatus 1, and internally accommodates the printing unit 10, the medium conveyance unit 20, the maintenance unit 30, the ink storage unit 40, the medium storage unit 50, and the control unit 60. Note that a metal frame not illustrated is disposed inside the housing 2, and the main body of the printing apparatus 1, that is, each component constituting the printing apparatus 1 is supported by the frame.

An operation panel 3 is disposed on a front surface 2*f* facing the +Y direction among the surfaces of the housing 2. The operation panel 3 includes a plurality of operation buttons 3*a* configured to receive user operations, and a display portion 3*b* configured to display various types of information. By using the operation panel 3, the user can instruct the control unit 60, for example, to form an image on the medium M and perform various settings. Of the surfaces of the housing 2, a side surface 2*s* facing the +X direction is provided with a paper ejection port 4 through which the medium M after the image is formed is discharged.

The housing 2 includes a plurality of opening/closing portions 5, 6, 7, and 8. Among them, the opening/closing portion 5 is disposed above the operation panel 3, that is, in the +Z direction, and the opening/closing portion 6 is disposed below the operation panel 3, that is, in the −Z direction. The opening/closing portion 7 is disposed on the right side of the opening/closing portion 6, that is, in the −X direction, toward the front surface 2*f*, and the opening/closing portion 8 is disposed above the opening/closing portion 7. The opening/closing portion 5 and the opening/closing portion 8 constitute a top surface 2*t* facing the +Z direction among the surfaces of the housing 2, and the opening/closing portion 6 and the opening/closing portion 7 constitute the front surface 2*f* of the housing 2.

Each of the opening/closing portions 5, 6, 7, and 8 can be opened/closed in a door-like manner, and the inside of the housing 2 can be accessed by opening the opening/closing portions 5, 6, 7, and 8. The opening/closing portions 5, 6, 7, and 8 are formed with handhold portions 5*a*, 6*a*, 7*a*, and 8*a*, respectively, to which a hand is put when the opening/closing portions 5, 6, 7, or 8, respectively, are opened/closed. The handhold portions 5*a*, 6*a*, 7*a*, and 8*a* are formed by cutting out a part of the opening/closing portions 5, 6, 7, and 8 in a concave shape, and are configured to receive a hand of the user.

Figure 2:
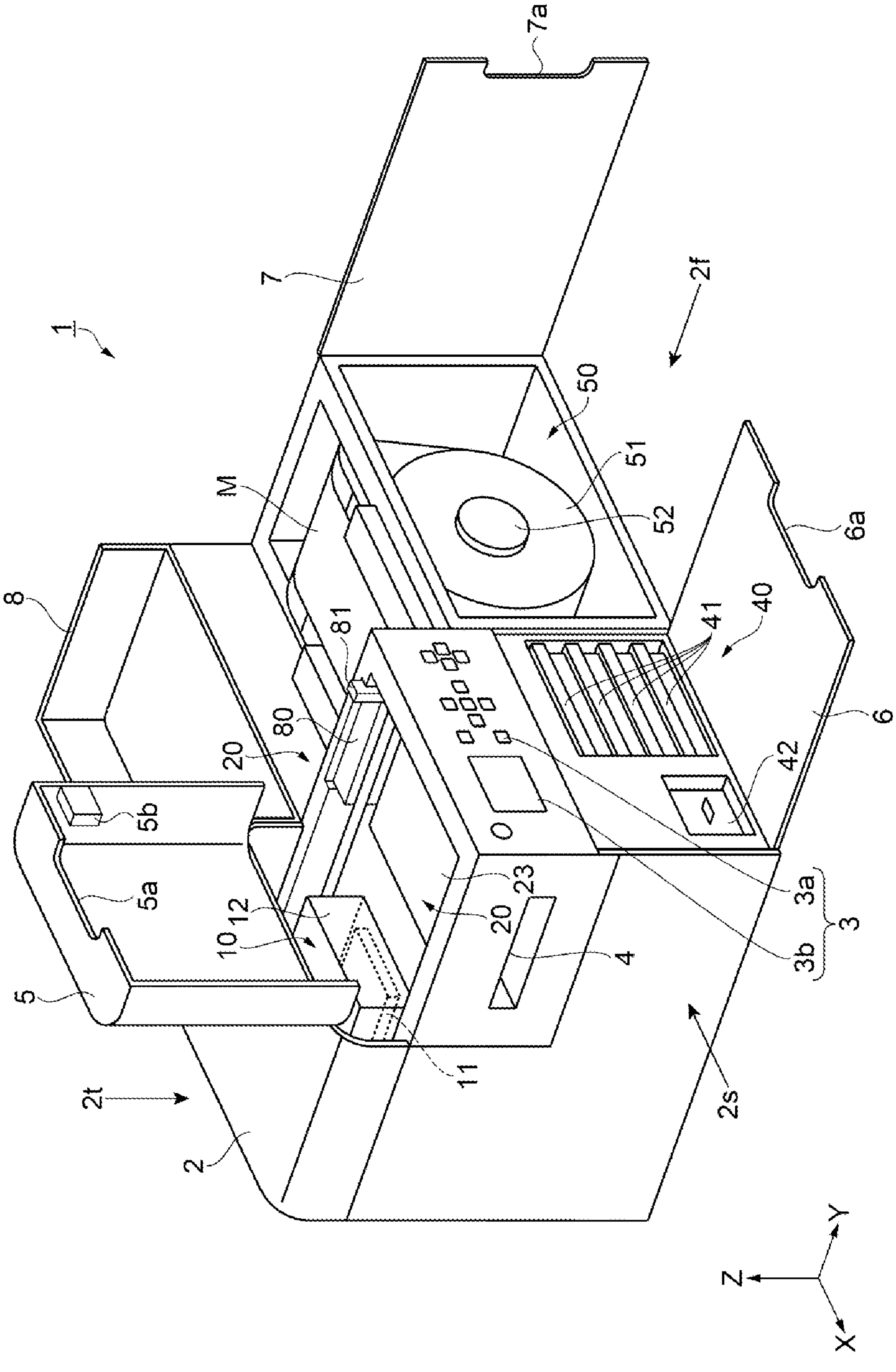
FIG. 2 is a perspective view illustrating the printing apparatus in a state where an opening/closing portion is opened.

FIG. 2 is a perspective view illustrating the printing apparatus 1 in a state where the opening/closing portions 5, 6, 7, and 8 are opened.

As illustrated in FIG. 2, the opening/closing portion 5 can be opened by lifting the handhold portion 5*a* upward and then moving the handhold portion 5*a* backward. When the opening/closing portion 5 is opened, the medium conveyance unit 20 configured to convey the medium M toward the paper ejection port 4 is exposed. Thus, the medium conveyance unit 20 can be accessed by opening the opening/closing portion 5. For example, when clogging of the medium M, that is, a jam of the medium M occurs in the medium conveyance unit 20, the opening/closing portion 5 is opened to perform jam processing of removing the clogged medium M.

The opening/closing portion 6 can be opened by pulling out the handhold portion 6*a* forward and then moving the handhold portion 6*a* downward. When the opening/closing portion 6 is opened, the ink storage unit 40 and a waste liquid tank 42 are exposed. The ink storage unit 40 stores an ink cartridge 41 accommodating ink, and the waste liquid tank 42 stores waste ink described later. Thus, the ink storage unit 40 and the waste liquid tank 42 can be accessed by opening the opening/closing portion 6.

The opening/closing portion 7 can be opened by pulling out the handhold portion 7*a* forward and then moving the handhold portion 7*a* rightward. When the opening/closing portion 7 is opened, the medium storage unit 50 configured to be mounted with the medium M is exposed. The medium storage unit 50 stores a roll body 51 that which is the medium M wound in a roll shape. Specifically, a rotation shaft 52 configured to rotate with respect to the housing 2 is disposed in the medium storage unit 50, and the roll body 51 is mounted to the rotation shaft 52.

The opening/closing portion 8 can be opened by lifting the handhold portion 8*a* upward and then moving the handhold portion 8*a* backward. When the opening/closing portion 8 is opened, a conveyance path through which the medium M pulled out from the roll body 51 is conveyed is exposed. The opening/closing portion 8 is opened/closed, for example, when the medium M pulled out from the roll body 51 is inserted into the medium conveyance unit 20.

Figure 3:
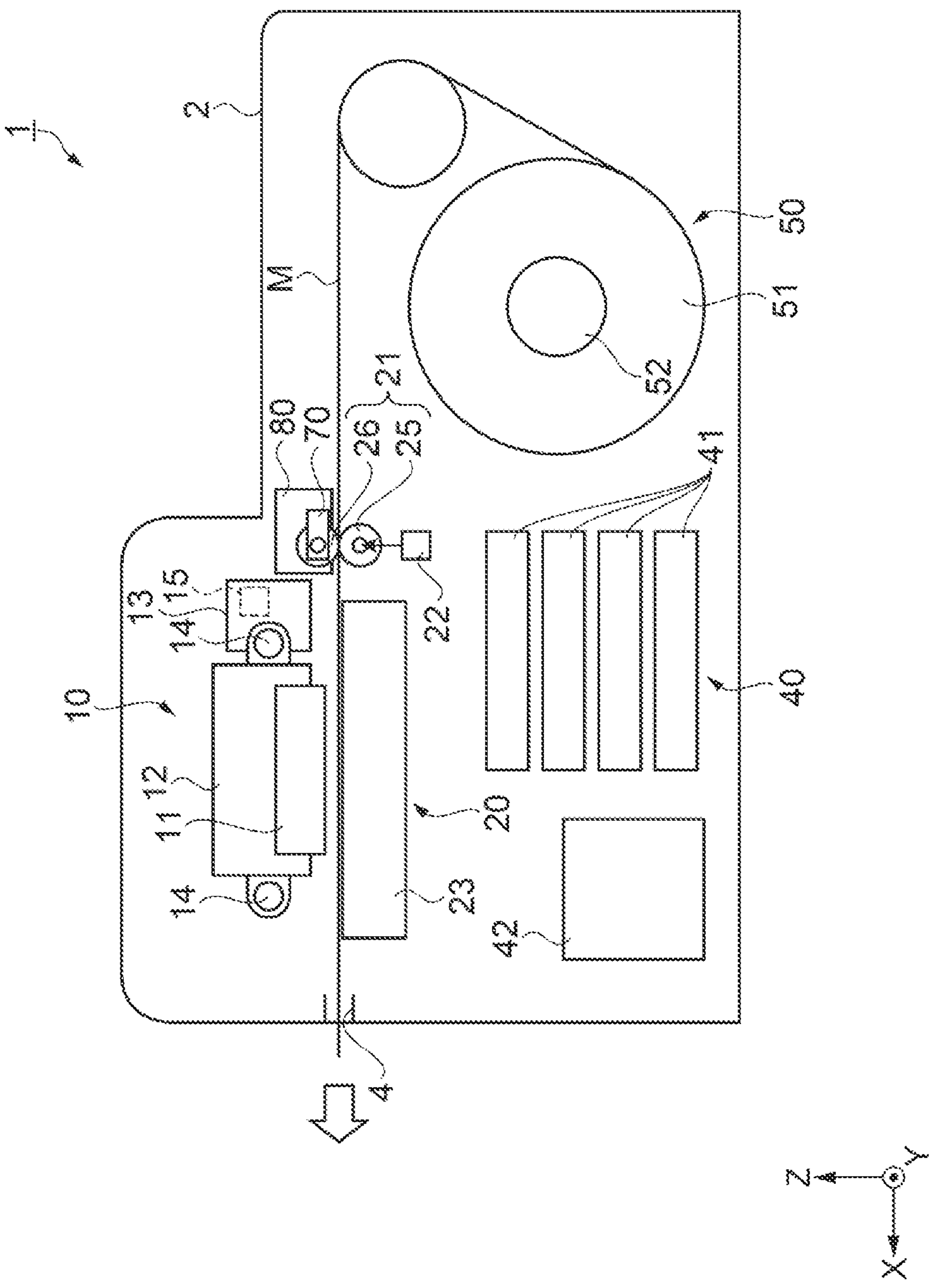
FIG. 3 is a configuration diagram illustrating a schematic configuration of the printing apparatus.

FIG. 3 is a configuration diagram illustrating a schematic configuration of the printing apparatus 1, and is a view of the inside of the housing 2 viewed from the front, that is, the +Y side.

As illustrated in FIG. 3, the printing unit 10 includes a print head 11, a carriage 12, and a carriage driving unit 13, and forms an image on the medium M. The print head 11 is an inkjet head configured to form an image on the medium M by ejecting ink. Specifically, the print head 11 includes a piezo actuator, and ejects ink downward from a nozzle formed on a lower surface by driving the piezo actuator under the control of the control unit 60. The print head 11 of the present embodiment is a line head in which a large number of nozzles are formed over the entire region in a width direction of the medium M, that is, the ±Y direction.

The print head 11 is supplied with a control signal from the control unit 60 via a flexible flat cable (FFC) not illustrated or the like. The print head 11 is supplied with the ink accommodated in the ink cartridge 41 through a flexible ink tube (not illustrated) or the like.

The carriage 12 supports the print head 11 and is movable in a front-rear direction, that is, the ±Y direction. Specifically, both left and right sides of the carriage 12, that is, both sides in the ±X direction are provided with a pair of guide shafts 14 extending in the ±Y direction, and the carriage 12 is guided by the guide shaft 14 to move in the ±Y direction. The guide shaft 14 is fixed with respect to the housing 2.

The carriage 12 is coupled to the carriage driving unit 13 and moves in the ±Y direction by driving of the carriage driving unit 13. The carriage driving unit 13 includes a pair of timing pulleys (not illustrated), a timing belt having an annular shape (not illustrated), and a carriage driving motor 15 that operates under the control of the control unit 60. The pair of timing pulleys is disposed in the vicinity of both ends in the ±Y direction of the guide shaft 14 on the −X side. The timing belt is stretched over the pair of timing pulleys, and a part thereof is coupled to the carriage 12. Torque from an output shaft of the carriage driving motor 15 is transmitted to one of the timing pulleys via a transmission. When the control unit 60 drives the carriage driving motor 15, one of the timing pulleys rotates, and the timing belt is circularly driven. Due to this, the carriage 12 coupled to the timing belt moves in the ±Y direction along the guide shaft 14.

Thus, since the carriage 12 is movable in the ±Y direction, the carriage 12 can switch, inside the housing 2, between a state of being positioned at a home position on the −Y side and a state of being positioned at a printing position on the +Y side. When the carriage 12 is in the printing position, the print head 11 overlaps the medium conveyance unit 20 in plan view viewed from the ±Z direction. Printing on the medium M is performed when the carriage 12 is in the printing position. Note that as described above, since the print head 11 of the present embodiment is a line head in which a large number of nozzles are formed over the entire region in the width direction of the medium M, it is not necessary to move the print head 11 in the ±Y direction during printing.

On the other hand, when the carriage 12 is in the home position, the print head 11 does not overlap the medium conveyance unit 20 but overlaps the maintenance unit 30 in plan view. The maintenance unit 30 includes a cap configured to cover the nozzle of the print head 11, and protects and performs maintenance of the print head 11 under the control of the control unit 60. For example, the control unit 60 executes flushing for forcibly ejecting ink from the print head 11 regardless of printing, thereby removing foreign matters, air bubbles, deteriorated ink, or the like in the nozzle. In this case, the maintenance unit 30 receives the ink ejected from the print head 11 and discharges the ink to the waste liquid tank 42 as waste ink.

The roll body 51 around which the medium M is wound is stored in the medium storage unit 50. The medium storage unit 50 is positioned on the −X side relative to the carriage 12 in the printing position. The medium M is pulled out from the roll body 51 and delivered to the medium conveyance unit 20 positioned in the +X direction.

The medium conveyance unit 20 includes a conveyance roller pair 21, a conveyance motor 22, a medium support portion 23, an arm unit 70, and a nip switching unit 80. The medium conveyance unit 20 conveys, toward the print head 11, the medium M pulled out from the roll body 51 stored in the medium storage unit 50. The conveyance roller pair 21 includes a driving roller 25 positioned on the −Z side and a driven roller 26 positioned on the +Z side. The conveyance motor 22 rotates the driving roller 25 under the control of the control unit 60. The driven roller 26 is biased toward the driving roller 25, and the conveyance roller pair 21 holds the medium M by the driving roller 25 and the driven roller 26 and conveys the medium M in the +X direction.

The arm unit 70 supports the driven roller 26. By moving the arm unit 70, the nip switching unit 80 switches between a nip state in which the driven roller 26 is pressed against the driving roller 25 at a predetermined pressure and a non-nip state in which the pressing of the driven roller 26 against the driving roller 25 is released. The medium M is conveyed in a nip state. On the other hand, when a jam of the medium M occurs in the medium conveyance unit 20, the driven roller 26 is switched to the non-nip state because of necessity of removing the clogged medium M. In the present embodiment, switching between the nip state and the non-nip state is performed in conjunction with opening/closing of the opening/closing portion 5. Details of the arm unit 70 and the nip switching unit 80 will be described later.

The medium support portion 23 supports the medium M conveyed in the +X direction by the conveyance roller pair 21. When the carriage 12 is in the printing position, the medium support portion 23 faces the print head 11 across the medium M. The medium M is supported by the medium support portion 23, and receives ejection of ink from the print head 11 while being conveyed in the +X direction that is the conveyance direction by the conveyance roller pair 21. The medium M on which an image is formed by ejection of ink is discharged from the paper ejection port 4 to the outside of the housing 2.

The ink storage unit 40 in which a plurality of ink cartridges 41 are stored and the waste liquid tank 42 are disposed below the medium conveyance unit 20. The ink cartridge 41 of the present embodiment includes four ink cartridges 41 accommodating inks of four colors of yellow, magenta, cyan, and black. The waste ink discharged from the maintenance unit 30 is stored in the waste liquid tank 42.

Next, the configurations and operations of the arm unit 70 and the nip switching unit 80 will be described with reference to FIGS. 4 to 8.

Figure 4:
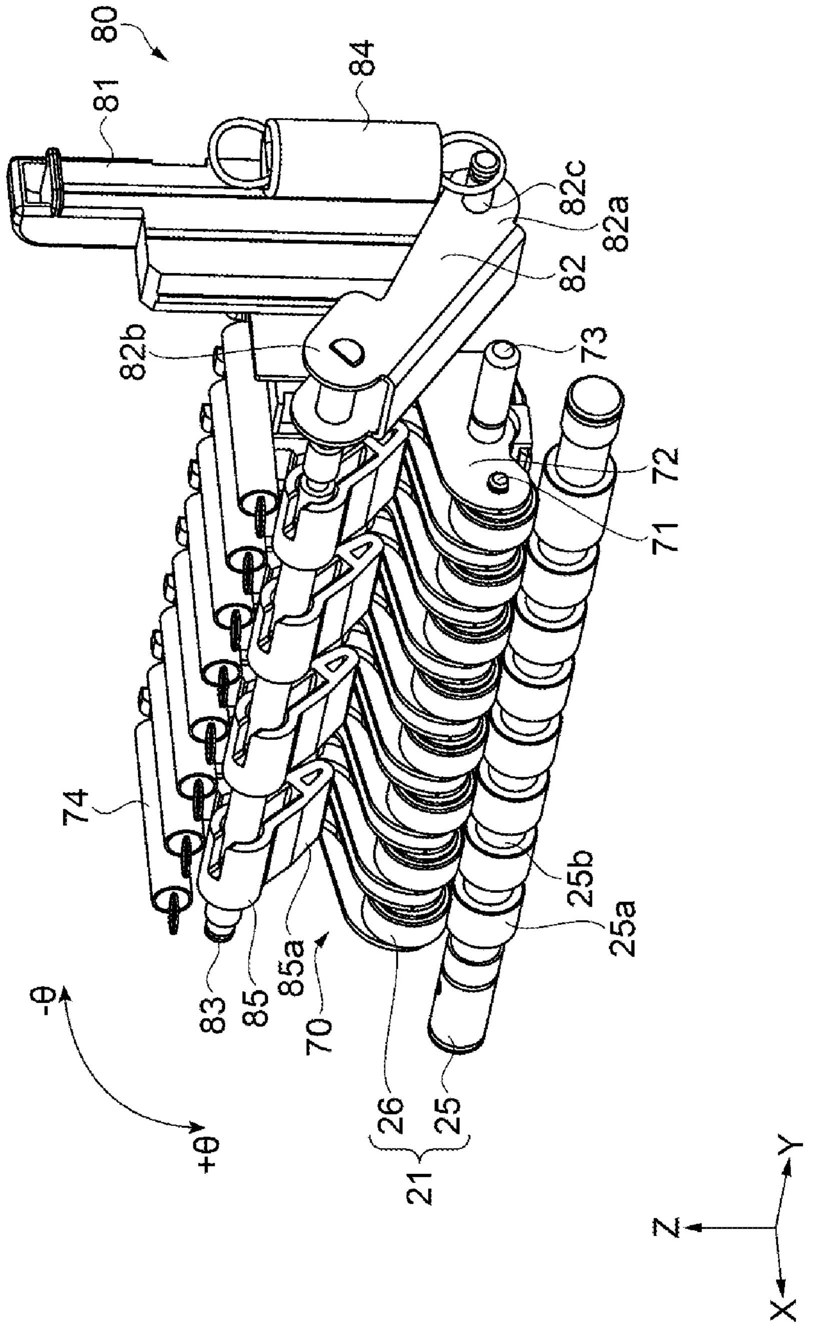
FIG. 4 is a perspective view illustrating configurations of an arm unit and a nip switching unit.
Figure 5:
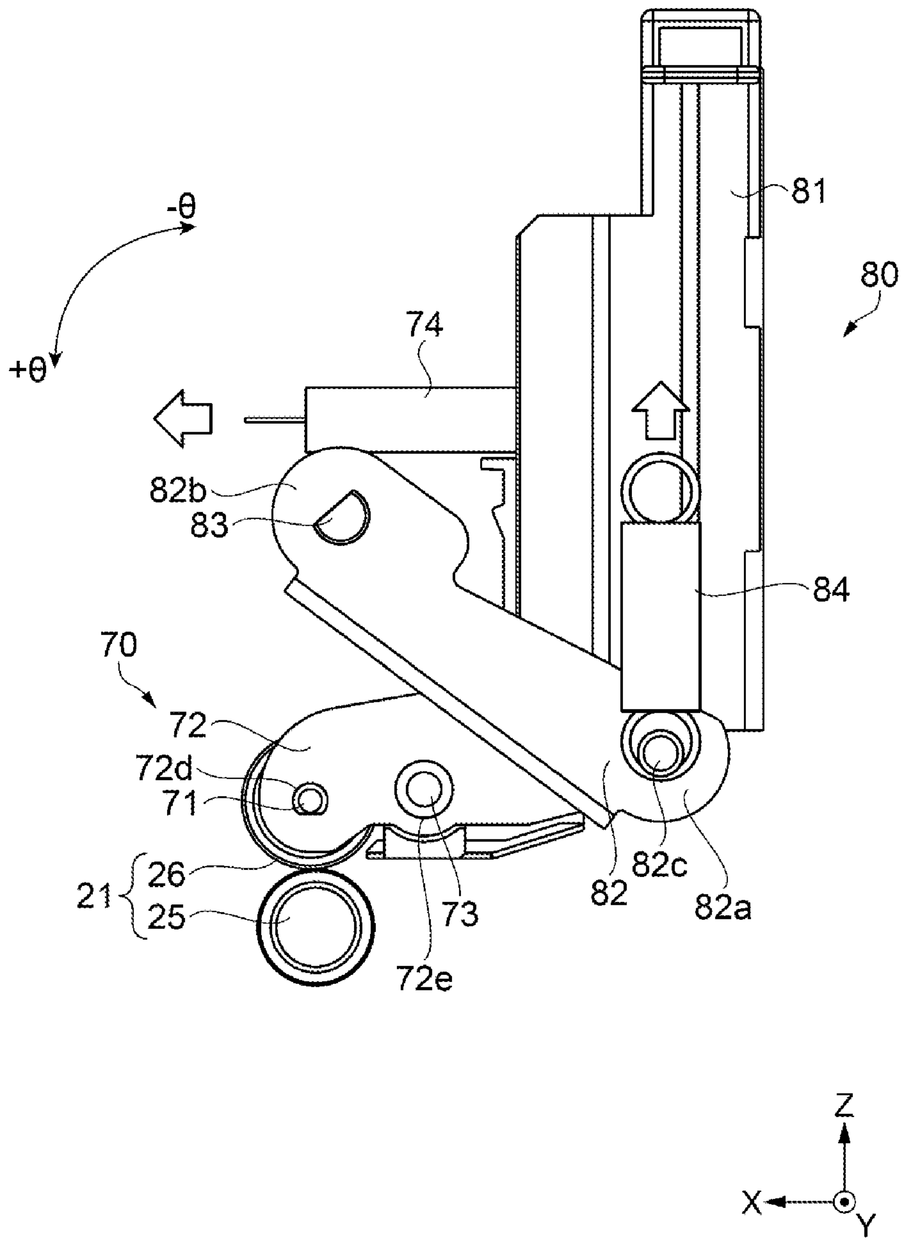
FIG. 5 is a side view of the arm unit and the nip switching unit as viewed from a +Y side.
Figure 6:
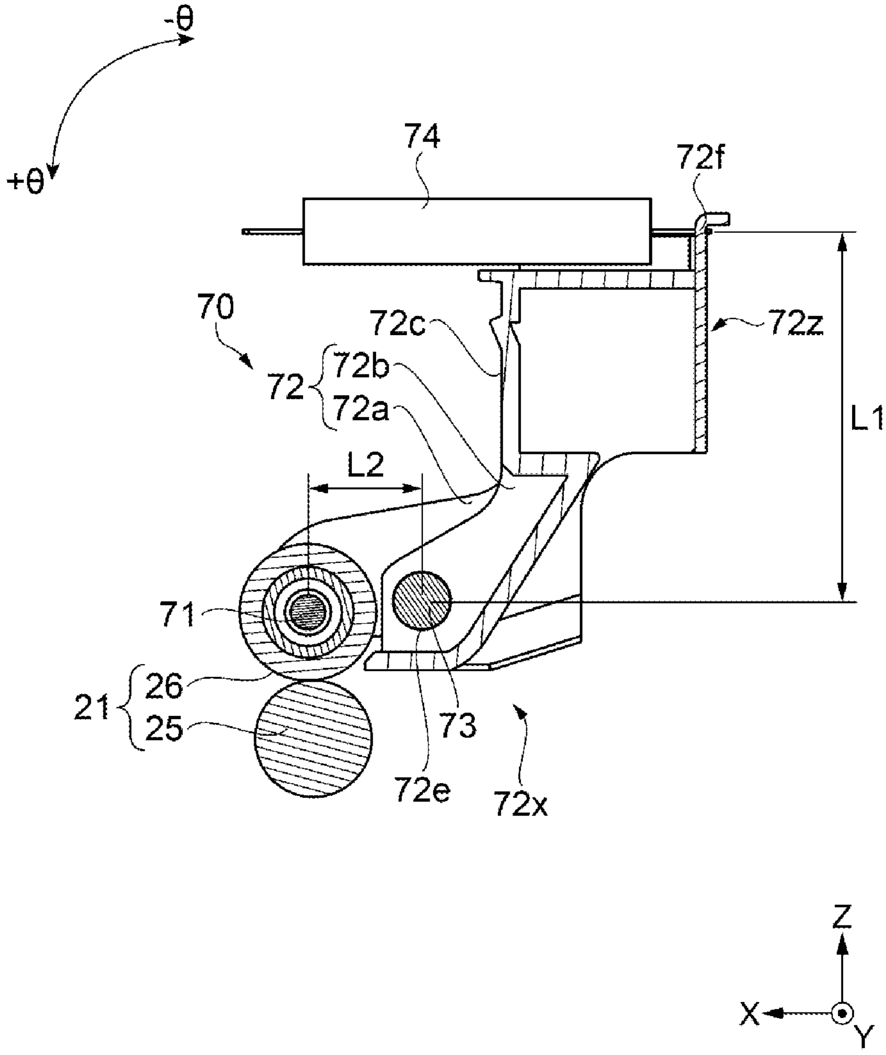
FIG. 6 is a cross-sectional view of the arm unit as viewed from the +Y side.
Figure 7:
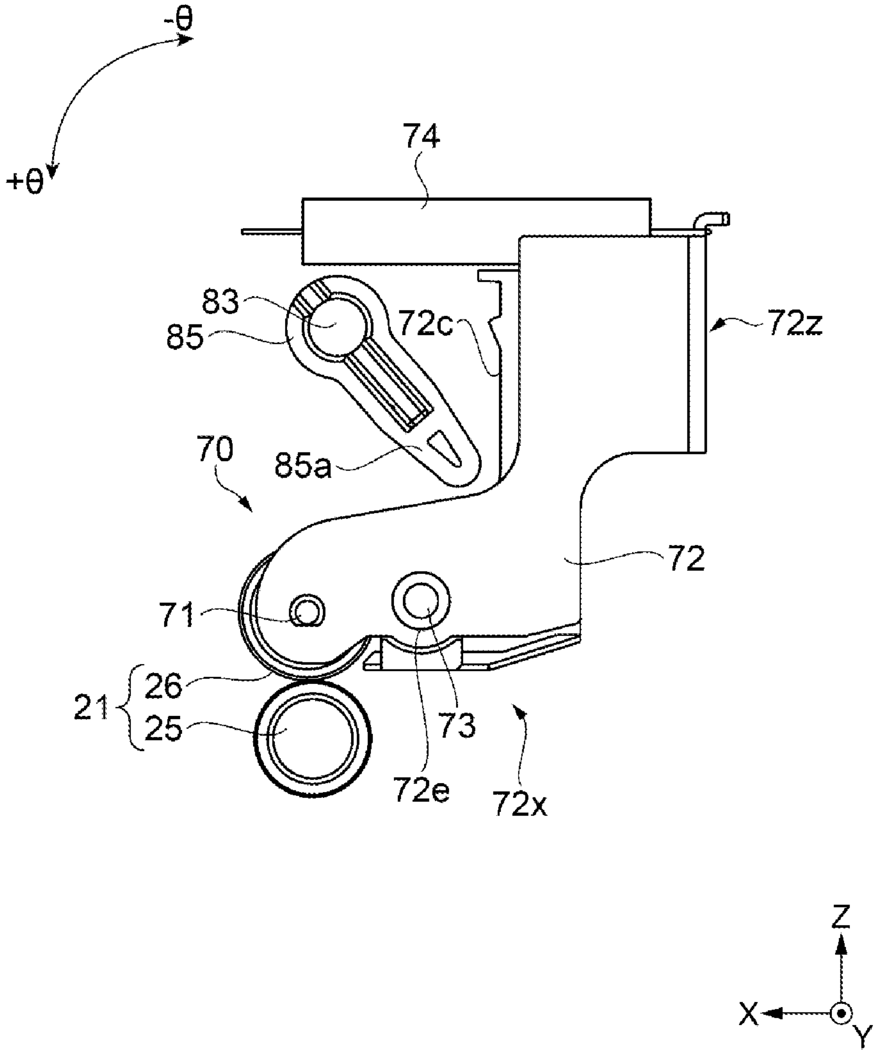
FIG. 7 is a side view illustrating operations of the arm unit and the nip switching unit.
Figure 8:
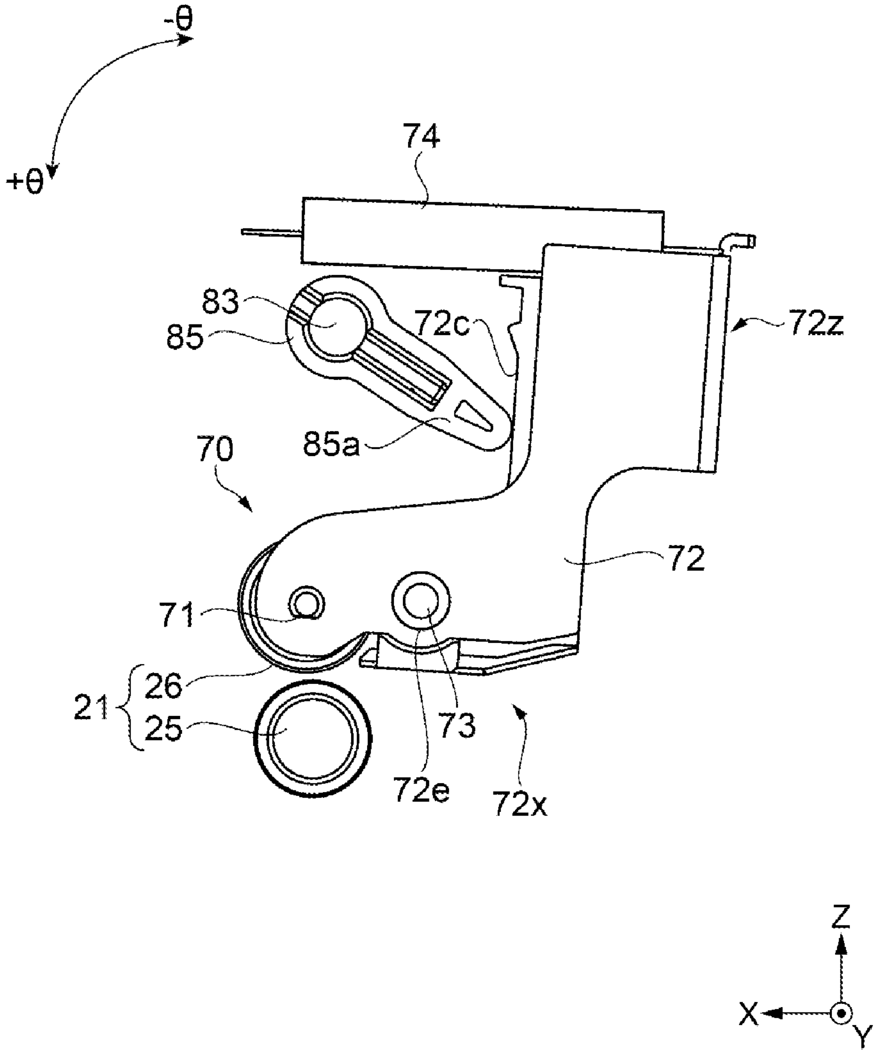
FIG. 8 is a side view illustrating operations of the arm unit and the nip switching unit.

FIG. 4 is a perspective view illustrating the configurations of the arm unit 70 and the nip switching unit 80, FIG. 5 is a side view of the arm unit 70 and the nip switching unit 80 as viewed from the +Y side, and FIG. 6 is a cross-sectional view of the arm unit 70 as viewed from the +Y side. FIGS. 7 and 8 are side views illustrating the operations of the arm unit 70 and the nip switching unit 80, FIG. 7 is a view illustrating a nip state, and FIG. 8 is a view illustrating a non-nip state.

As illustrated in FIGS. 4 to 8, the driving roller 25 is a substantially columnar roller extending in the ±Y direction, and includes a contact portion 25*a* that has a relatively large diameter and that comes into contact with the medium M, and a non-contact portion 25*b* that has a relatively small diameter and that does not come into contact with the medium M. The contact portion 25*a* and the non-contact portion 25*b* are alternately arrayed along the ±Y direction, and the driving roller 25 of the present embodiment includes eight contact portions 25*a*. The driving roller 25 is rotatably supported by a frame (not illustrated) or the like, and is rotated by driving of the conveyance motor 22 (see FIG. 3). Specifically, the driving roller 25 conveys the medium M in the +X direction by rotating anticlockwise as viewed from the +Y side.

In the +Z direction of the driving roller 25, eight driven rollers 26 are arrayed along the ±Y direction corresponding to the contact portions 25*a* of the driving roller 25. Each of the driven rollers 26 is individually rotatably supported by the arm unit 70. The driven roller 26 rotates following conveyance of the medium M by the driving of the driving roller 25. Specifically, the driven roller 26 follows conveyance of the medium M in the +X direction, and rotates clockwise as viewed from the +Y side. Note that hereinafter, the anticlockwise rotation direction in side view viewed from the +Y side is called a +θ direction, and the clockwise rotation direction is called a −θ direction. The +θ direction corresponds to the third direction, and the −θ direction, which is the opposite direction, corresponds to the fourth direction.

The arm unit 70 includes a support shaft 71 rotatably supporting the driven roller 26, an arm unit main body 72 supporting the support shaft 71, a rotation shaft 73 supporting the arm unit main body 72 rotatably in the ±θ direction, and a spring 74. The support shaft 71 and the rotation shaft 73 extend along the ±Y direction, and the rotation shaft 73 is positioned in the −X direction of the support shaft 71. Eight support shafts 71, eight arm unit main bodies 72, and eight springs 74 are provided corresponding to the driven rollers 26, and the rotation shaft 73 is disposed extending through the eight arm unit main bodies 72. The rotation shaft 73 corresponds to the second rotation shaft.

As illustrated in FIG. 6, the arm unit main body 72 includes a sheet-metal member 72*a* formed of a metal plate-like member and a resin member 72*b* made of resin. The sheet-metal member 72*a* supports the support shaft 71 on both sides in the ±Y direction of the driven roller 26. The resin member 72*b* is held by the sheet-metal member 72*a* from both sides in the ±Y direction on the −X side of the driven roller 26. The resin member 72*b* includes, on a side surface facing the +X direction, a cam reception portion 72*c* with which a cam 85 described later is configured to come into contact. The arm unit main body 72 is formed by integrating the sheet-metal member 72*a* and the resin member 72*b*. The arm unit main body 72 corresponds to the main body portion.

The arm unit main body 72 has a substantially L shape as a whole, and includes a first part 72*x* extending in the substantially +X direction and a second part 72*z* extending in the substantially +Z direction. A hole portion 72*d* (see FIG. 5) through which the support shaft 71 is inserted is formed at a tip end portion of the first part 72*x*, that is, an end portion in the +X direction. When inserted into the hole portion 72*d*, the support shaft 71 is non-rotatably supported by the tip end portion of the first part 72*x*. A hole portion 72*e* through which the rotation shaft 73 is inserted is formed substantially at the center in the ±X direction of the first part 72*x*. The rotation shaft 73 is supported by a frame (not illustrated) or the like, and when inserted into the hole portion 72*e*, supports the arm unit main body 72 rotatably in the ±θ direction. That is, the rotation shaft 73 supports the arm unit main body 72 with the first part 72*x*.

The cam reception portion 72*c* described above is included in the second part 72*z*. A tip end portion of the second part 72*z*, that is, an end portion in the +Z direction is provided with a locking portion 72*f* to which one end of the spring 74 is locked. The other end of the spring 74 is locked to a frame (not illustrated) or the like, and the spring 74 biases the locking portion 72*f* in the +X direction. By the action of the spring 74, the arm unit main body 72 is biased to rotate in the +θ direction. Due to this, the driven roller 26 is pressed against the driving roller 25 at a predetermined pressure in the −Z direction and brought into a nip state. The spring 74 corresponds to the second biasing member, and the locking portion 72*f* corresponds to the biased portion.

Here, a length L1 along the ±Z direction from the rotation shaft 73 to the locking portion 72*f* is longer than a length L2 along the ±X direction from the rotation shaft 73 to the support shaft 71. Therefore, when the driven roller 26 is pressed against the driving roller 25 at a predetermined pressure, it is not necessary to increase the biasing force of the spring 74 so much.

As illustrated in FIGS. 4 and 5, the nip switching unit 80 includes a lever member 81, a coupling member 82, a rotation shaft 83, a spring 84, and the cam 85. The lever member 81 is disposed in the +Y direction of the arm unit 70. The lever member 81 is a member extending in the ±Z direction, and is movable in the ±Z direction while being guided by a guide member (not illustrated). The lever member 81 can protrude by a predetermined length in the +Z direction relative to an opening portion of the housing 2 covered by the opening/closing portion (see FIG. 2).

The coupling member 82 supports the lever member 81. The coupling member 82 is a member extending in an oblique direction with respect to the X-axis and the Z-axis, and extends in a synthesized direction of the +X direction and the +Z direction from one end 82*a* toward another end 82*b*. The coupling member 82 includes a shaft member 82*c* extending in the ±Y direction at the one end 82*a*, and the lever member 81 is supported by the shaft member 82*c*. Specifically, the shaft member 82*c* is formed of a round bar, and the lever member 81 is disposed such that a lower surface of the lever member 81 is in contact with the shaft member 82*c*. The shaft member 82*c* corresponds to the lever support portion.

At the other end 82*b* of the coupling member 82, the rotation shaft 83 extending along the ±Y direction is non-rotatably coupled to the coupling member 82. The rotation shaft 83 is supported by a frame (not illustrated) or the like so as to be configured to rotate in the ±θ direction together with the coupling member 82 along with rotation of the coupling member 82 in the ±θ direction. Specifically, when the shaft member 82*c* is displaced in the +Z direction, the coupling member 82 rotates the rotation shaft 83 in the +θ direction along with this displacement, and when the shaft member 82*c* is displaced in the −Z direction, the coupling member 82 rotates the rotation shaft 83 in the −θ direction along with this displacement. The rotation shaft 83 corresponds to the first rotation shaft.

One end of the spring 84 is locked to the shaft member 82*c*. The other end of the spring 84 is locked to a frame (not illustrated) or the like, and the spring 84 biases the shaft member 82*c* in the +Z direction. That is, the coupling member 82 and the rotation shaft 83 are biased to rotate in the +θ direction by the action of the spring 84. The spring 84 biases the lever member 81 in the +Z direction via the shaft member 82*c*. Therefore, in a state where the opening/closing portion 5 is opened, an upper end portion of the lever member 81 protrudes in the +Z direction from the opening portion of the housing 2. The spring 84 corresponds to the first biasing member.

As illustrated in FIG. 2, the opening/closing portion 5 has, on the back surface, a lever pressing portion 5*b* configured to press the lever member 81 in the −Z direction. When the user closes the opening/closing portion 5, that is, when the opening/closing portion 5 transitions from the open state to the closed state, the lever pressing portion 5*b* presses the lever member 81 in the −Z direction against the biasing force of the spring 84. As a result, the shaft member 82*c* is displaced in the −Z direction, and the coupling member 82 and the rotation shaft 83 rotate in the −θ direction. The lever pressing portion 5*b* is in contact with the upper end of the lever member 81 in the closed state of the opening/closing portion 5, and regulates movement of the lever member 81 in the +Z direction. Although not illustrated, the opening/closing portion 5 is provided with a lock mechanism configured to lock the opening/closing portion 5 in a closed state. This lock mechanism releases lock in conjunction with the operation of opening the opening/closing portion 5, and when the opening/closing portion 5 is closed, the lock mechanism locks the opening/closing portion 5 in a closed state by biasing of a spring or the like. Therefore, when the opening/closing portion 5 is in the closed state, the lever member 81 does not open the opening/closing portion 5 by the biasing force of the spring 84. That is, when the opening/closing portion 5 is in the closed state, the lever pressing portion 5*b* holds the lever member 81 in a state of pressing the lever member 81 in the −Z direction.

On the other hand, when the user opens the opening/closing portion 5, that is, when the opening/closing portion 5 transitions from the closed state to the open state, the lever pressing portion 5*b* is separated from the lever member 81, and the regulation of the movement of the lever member 81 in the +Z direction is released. Therefore, the shaft member 82*c* is displaced in the +Z direction by the biasing force of the spring 84, and the lever member 81 moves in the +Z direction along with the displacement of the shaft member 82*c*. Here, the movement amount in the +Z direction of the lever member 81 is limited to the predetermined length by a locking unit (not illustrated) or the like. Therefore, the upper end portion of the lever member 81 does not protrude beyond the predetermined length from the opening portion of the housing 2.

Note that since the coupling member 82 rotates in the ±θ direction with the rotation shaft 83 as the center of rotation, the shaft member 82*c* is displaced in both the +X direction and the ±Z direction. On the other hand, since the lever member 81 is movable only in the ±Z direction, the shaft member 82*c* slides in the ±X direction on the lower surface of the lever member 81.

For the rotation shaft 83, four cams 85 arrayed along the ±Y direction are non-rotatably fixed to the rotation shaft 83. Therefore, the cams 85 rotate together with the rotation shaft 83. That is, the cams 85 rotate in the +θ direction along with the rotation of the rotation shaft 83 in the +θ direction, and rotate in the −θ direction along with the rotation of the rotation shaft 83 in the −θ direction. The cam 85 is made of resin, and has a projection portion 85*a* extending in a radial direction of the rotation shaft 83. The direction in which the projection portion 85*a* protrudes is common to the four cams 85. By the rotation of the rotation shaft 83, the cam 85 can switch between a state of being separated from the arm unit main body 72 and a state of pressing the cam reception portion 72*c* of the arm unit main body 72 by the projection portion 85*a*. Each of the cams 85 is disposed across the two arm unit main bodies 72. That is, one cam 85 presses the two cam reception portions 72*c*.

When the opening/closing portion 5 is in the closed state, that is, in a state where the movement of the lever member 81 in the +Z direction is regulated by the lever pressing portion 5*b*, the cam 85 is separated from the arm unit main body 72 as illustrated in FIG. 7. In this state, the driven roller 26 is maintained in a nip state by the biasing force of the spring 74.

On the other hand, when the user opens the opening/closing portion 5, in the process of transitioning from the closed state to the open state, the shaft member 82*c* is released from the pressing in the −Z direction by the lever pressing portion 5*b*. Therefore, the shaft member 82*c* is displaced in the +Z direction by the biasing force of the spring 84, and moves the lever member 81 in the +Z direction. The rotation shaft 83 rotates in the +θ direction along with the displacement in the +Z direction of the shaft member 82*c*. As a result, as illustrated in FIG. 8, the cam 85 rotates in the +θ direction together with the rotation shaft 83, and presses, by the projection portion 85*a*, the cam reception portion 72*c* of the arm unit main body 72 in the −X direction against the biasing force of the spring 74. Due to this, the cam 85 rotates the arm unit main body 72 in the −θ direction. Then, the driven roller 26 moves in a direction away from the driving roller 25, that is, the +Z direction along with the rotation of the arm unit main body 72 in the −θ direction, and is switched from the nip state to the non-nip state.

Thus, switching between the nip state and the non-nip state of the driven roller 26 is executed in conjunction with opening/closing of the opening/closing portion 5. Specifically, when the opening/closing portion 5 is in the closed state, the driven roller 26 is brought into the nip state, and can convey the medium M. On the other hand, when the opening/closing portion 5 is in the open state, the driven roller 26 is brought into the non-nip state, and the medium M clogged by the jam can be removed. Therefore, when opening the opening/closing portion 5 to perform jam processing of the medium M, the user does not need to separately perform an operation for bringing the driven roller 26 into the non-nip state other than the operation of opening the opening/closing portion 5. After the end of the jam processing, it is not necessary to separately perform an operation for returning the driven roller 26 to the nip state other than the operation of closing the opening/closing portion 5.

As described above, according to the printing apparatus 1 of the present embodiment, the following effects can be obtained.

According to the present embodiment, the nip state and the non-nip state of the conveyance roller pair 21 are switched in conjunction with opening/closing of the opening/closing portion 5 without using an electrical configuration. Therefore, even in a state where the power supply of the printing apparatus 1 is off, the nip state and the non-nip state can be switched by opening/closing the opening/closing portion 5.

According to the present embodiment, the length L1 along the ±Z direction from the rotation shaft 73 to the locking portion 72*f* is longer than the length L2 along the ±X direction from the rotation shaft 73 to the support shaft 71. Therefore, the driven roller 26 can be pressed against the driving roller 25 with a predetermined pressure without increasing the biasing force of the spring 74 so much. This can reduce the force by which the cam 85 presses the cam reception portion 72*c*. As a result, the strength required for the arm unit 70 and the nip switching unit 80 is reduced, and the printing apparatus 1 can be reduced in weight.

According to the present embodiment, since the cam 85 and the cam reception portion 72*c* are made of resin, wear of the both can be suppressed as compared with when at least one of the cam 85 or the cam reception portion 72*c* is made of metal.

The above embodiment may be changed as follows.

In the above embodiment, the number of the contact portions 25*a* in the driving roller 25, the number of the driven rollers 26, and the number of the cams 85 are not limited to those described above, and can be changed as appropriate.

Figure 9:
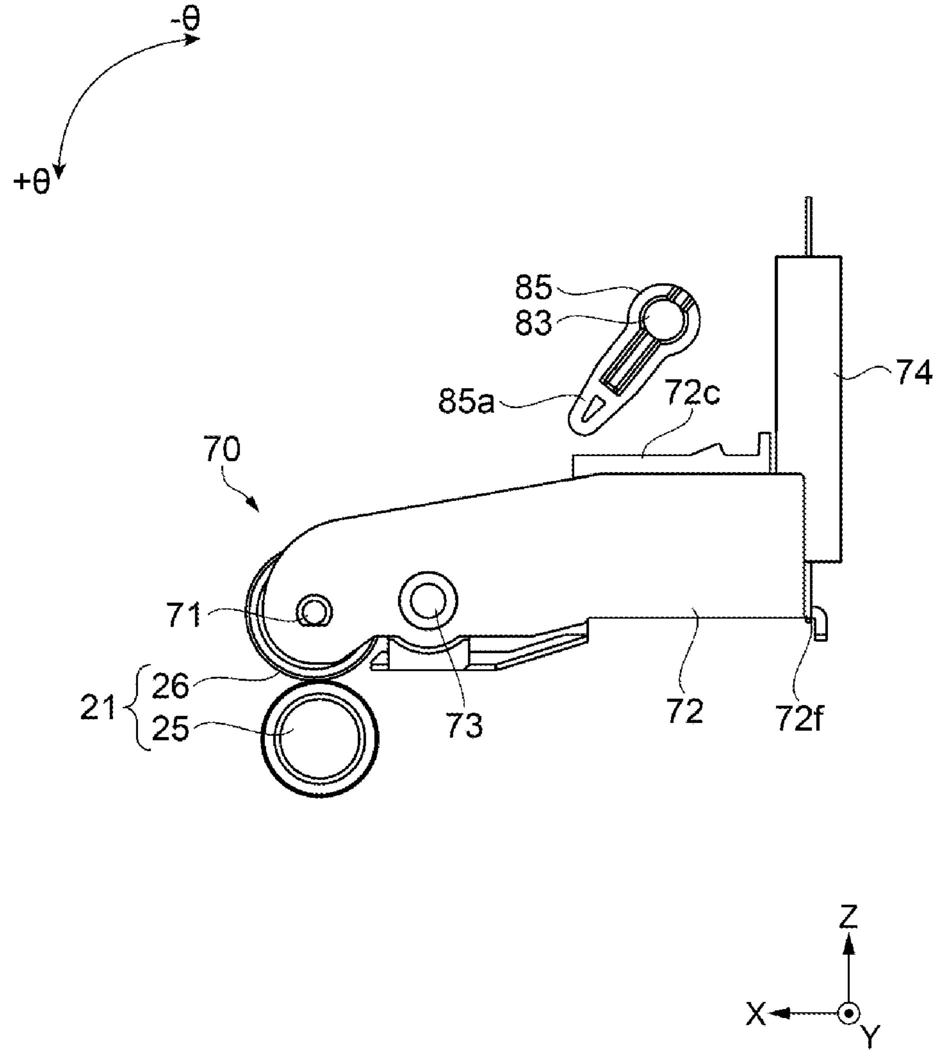
FIG. 9 is a side view illustrating an arm unit according to a modification.

In the above embodiment, the shape of the arm unit main body 72 is not limited to the L shape. For example, as illustrated in FIG. 9, the arm unit main body 72 may have a shape extending in the ±X direction. In the configuration illustrated in FIG. 9, the end portion in the −X direction of the arm unit main body 72 is provided with the locking portion 72*f*, and the spring 74 biases the arm unit main body 72 in the +θ direction by biasing the locking portion 72*f* in the +Z direction. When the opening/closing portion 5 is opened and the rotation shaft 83 rotates in the +θ direction, the cam 85 presses the cam reception portion 72*c* in the −Z direction against the biasing force of the spring 74, whereby the driven roller 26 moves in a direction away from the driving roller 25 and is brought into the non-nip state.

In the above embodiment, in place of the spring 74 and the spring 84, another elastic member such as rubber may be used.

In the above embodiment, the liquid ejected by the print head 11 is not limited to ink. For example, the print head 11 may eject a liquid body containing, in a dispersed or dissolved state, a material such as an electrode material or a coloring material used for manufacturing various displays.

In the above embodiment, an aspect in which the ink cartridge 41 accommodating ink is stored in the printing apparatus 1 is described, but an aspect in which ink is poured into a tank included in the printing apparatus 1 may be adopted.

In the above embodiment, the print head 11 is constituted by a line head, but is not limited to this configuration. For example, the print head 11 may be a serial head, and may have a configuration of ejecting ink while moving the carriage 12 in the ±Y direction.

In the above embodiment, the printing apparatus 1 is not limited to the inkjet type. For example, the printing apparatus 1 may be a thermal type in which the ink applied to an ink ribbon is transferred to the medium M by a thermal head. The printing apparatus 1 may be a laser type that transfers toner accommodated in a cartridge or the like to the medium M using a photoreceptor.

In the above embodiment, the handhold portions 5*a*, 6*a*, 7*a*, and 8*a* are not limited to the configuration formed in a concave shape. For example, the handhold portions 5*a*, 6*a*, 7*a*, and 8*a* may have a configuration formed in a convex shape like a handle.

In the above embodiment, an aspect in which the medium M is supplied to the printing apparatus 1 as the roll body 51 is described, but the supply aspect of the medium M is not limited to the above. For example, an aspect in which a cassette on which the sheet-like medium M is loaded is supplied to the printing apparatus 1 or an aspect in which the sheet-like medium M is manually supplied may be adopted. The material of the medium M is not particularly limited, and various materials such as paper, textiles such as cloth and woven fabric, and vinyl chloride resin can be adopted.

What is claimed is:

1. A printing apparatus comprising:

a conveyance roller pair including a driving roller and a driven roller and configured to sandwich and convey a print medium;

an arm unit supporting the driven roller;

a nip switching unit configured to switch between a nip state in which the driven roller is pressed against the driving roller and a non-nip state in which pressing of the driven roller against the driving roller is released;

a printing unit configured to form an image on the print medium; and a housing internally accommodating the conveyance roller pair, the arm unit, the nip switching unit, and the printing unit, wherein the nip switching unit includes a first rotation shaft, a lever member configured to move in a first direction and a second direction opposite to the first direction, a coupling member that includes a lever support portion supporting the lever member at one end and to which the first rotation shaft is non-rotatably coupled at another end, the coupling member being configured to rotate the first rotation shaft in a third direction along with displacement of the lever support portion in the first direction and rotate the first rotation shaft in a fourth direction opposite to the third direction along with displacement of the lever support portion in the second direction, a cam non-rotatably fixed to the first rotation shaft and configured to rotate in the third direction along with rotation of the first rotation shaft in the third direction and rotate in the fourth direction along with rotation of the first rotation shaft in the fourth direction, and a first biasing member configured to bias the lever support portion in the first direction, the arm unit includes a support shaft rotatably supporting the driven roller, a main body portion supporting the support shaft and including a cam reception portion with which the cam is configured to come into contact, a second rotation shaft supporting the main body portion rotatably in the third direction and the fourth direction, and a second biasing member configured to bias the main body portion to rotate the main body portion in the third direction, the housing includes an opening/closing portion configured to enable access to an inside of the housing, the opening/closing portion includes a lever pressing portion configured to press the lever member in the second direction, the lever pressing portion presses the lever member in the second direction and displaces the lever support portion in the second direction against a biasing force of the first biasing member when the opening/closing portion transitions from an open state to a closed state, and holds the lever member in a state of being pressed in the second direction in the closed state, the driven roller is maintained in the nip state by a biasing force of the second biasing member in the closed state, and in a process in which the opening/closing portion transitions from the closed state to the open state, the lever support portion is released from pressing in the second direction by the lever pressing portion and is displaced in the first direction by the biasing force of the first biasing member to move the lever member in the first direction, the first rotation shaft rotates in the third direction along with displacement of the lever support portion in the first direction, the cam rotates in the third direction together with the first rotation shaft, and rotates the main body portion in the fourth direction by pressing the cam reception portion of the main body portion against the biasing force of the second biasing member, and the driven roller is switched from the nip state to the non-nip state along with rotation of the main body portion in the fourth direction.

2. The printing apparatus according to claim 1, wherein the main body portion has an L shape including a first part extending in a fifth direction and a second part extending in a sixth direction intersecting the fifth direction, the support shaft is supported at a tip end portion in the fifth direction of the first part, the cam reception portion is included in the second part, the second biasing member biases, in the fifth direction, a biased portion included at a tip end portion in the sixth direction of the second portion, the second rotation shaft supports the main body portion at the first part, and a length along the sixth direction from the second rotation shaft to the biased portion is longer than a length along the fifth direction from the second rotation shaft to the support shaft.

3. The printing apparatus according to claim 1, wherein the cam and the cam reception portion are made of resin.

4. The printing apparatus according to claim 1, wherein the lever support portion is formed of a round bar.

* * * * *